United States Patent [19]

Seamans

[11] Patent Number: 4,528,173

[45] Date of Patent: Jul. 9, 1985

[54] ELECTROLYTIC PROCESS FOR DESULPHURIZATION AND SEED REGENERATION IN COAL FIRED MAGNETOHYDRODYNAMIC (MHD) POWER GENERATION SYSTEMS

[75] Inventor: Thomas F. Seamans, Weston, Mass.

[73] Assignee: Ionics, Incorporated, Watertown, Mass.

[21] Appl. No.: 67,591

[22] Filed: Aug. 17, 1979

[51] Int. Cl.³ .................... H02K 45/00; C01B 17/02
[52] U.S. Cl. .................................. 423/421; 204/98; 204/104; 310/11
[58] Field of Search ............... 204/93, 98, 104; 423/242 A, 421; 310/11

[56] References Cited

U.S. PATENT DOCUMENTS 3,801,698  4/1974  Lowrance et al. ............... 423/254

FOREIGN PATENT DOCUMENTS 2302130  9/1976  France ........................... 204/104

*Primary Examiner*—John F. Niebling
*Attorney, Agent, or Firm*—Norman E. Saliba

[57] ABSTRACT

An electrolytic process for desulphurization and seed reprocessing and recovery in open cycle coal fired MHD electrical power generation systems is disclosed. Alkali metal sulfate is removed from the gaseous effluent of the generator and electrolyzed in solution in an electrolytic cell to alkali metal hydroxide and sulphuric acid. The alkali metal hydroxide may be recycled directly into the system combustor or may undergo further conversion to alkali metal carbonate or bicarbonate or both by carbonation reaction with the carbon dioxide contained in the substantially desulfurized MHD generator effluent gas. An alternative electrolytic cell conversion of alkali metal bicarbonate to alkali metal carbonate is also disclosed.

3 Claims, 3 Drawing Figures

AM = ANION SELECTIVE MEMBRANE
CM = CATION SELECTIVE MEMBRANE

AM = ANION SELECTIVE MEMBRANE
CM = CATION SELECTIVE MEMBRANE

ELECTROLYTIC PROCESS FOR DESULPHURIZATION AND SEED REGENERATION IN COAL FIRED MAGNETOHYDRODYNAMIC (MHD) POWER GENERATION SYSTEMS

BACKGROUND OF THE INVENTION

1. Field of the Invention

The invention resides in the field of coal fired MHD eletrical power generators and more particularly relates to processes for seed recovery and desulphurization of the generator gaseous effluent.

2. Description of the Prior Art

The theory and practice of MHD electircal power generating systems is well known in the prior art. In such systems, an electrically conducting fluid is passed between a pair of electrodes in the presence of a strong magnetic field to produce an electrical voltage across the electrodes. Plasmas or ionized gases are particularly suitable fluids for this process and may be generated by the combustion of fossil fuels such as coal. In such coal fired generators, the exhaust (flue) gases are ultimately expended into the atmosphere constituting an open cycle system as opposed to a closed cycle system in which the conducting fluid is recycled back through the generator.

The highest combustion temperatures attainable with coal (about 3,000° C.) produce an insufficiently ionized combustion product to generate a satisfactory electrical power yield. Consequently, to increase conductivity the hot combustion gas is seeded with a material which undergoes thermal ionization such as an alkali metal, preferably potassium, which ionizes easily at the prevailing temperatures. In consequential descriptions, the metal of the seed material will be designated as potassium since it is the most common alkali metal used. Rubidium and cesium metal may also be employed advantageously since the higher the atomic weight of the alkali metal, the better the ionization.

In the combustion of coal, a substantial amount of $SO_2$ is formed from the sulfur contained in the coal in which the seeded system reacts with the seed material to form potassium sulfate. This material may be recovered from the gaseous effluent of the generator by electrostatic precipitation which has the effect of removing both the seed (potassium) and objectionable sulphur pollution from the spent combustion gases which are subsequently exhausted as a flue gas into the atmosphere.

It is then necessary to separate the potassium from the sulphur to allow potassium reseeding of the system combustor. One separation method which has been proposed in MHD system configurations is the use of a reduction reactor in which a synthesis gas of carbon monoxide and hydrogen are reacted with the potassium sulfate to yield essentially the products of hydrogen sulfide and potassium carbonate. An absorber/stripper separates the two products after which sulfide with the aid of oxygen (air) is converted to solid sulphur, water, and some sulphur dioxide ($SO_2$) in a claus reactor. This process requires the supply of auxiliary gases, i.e. hydrogen, carbon monoxide, and oxygen, and results in at least some gases ($SO_2$) containing sulphur still being exhausted into the atmosphere.

The invention described below is highly economical in that it eliminates the need for auxiliary gases, produces little objectionable secondary gases, and yields a commercially useful byproduct, sulphuric acid.

SUMMARY OF THE INVENTION

The invention may be summarized as an electrolytic process for combined desulphurization and seed recovery in an open cycle, coal fired MHD electrical power generator. The combustion gas is seeded (to increase conductivity) with an alkali metal salt preferably of the metal potassium. Potassium sulfate formed during combustion is precipitated or otherwise removed from the generator effluent gas and fed in solution to an electrolytic cell (preferably a four compartment cell) arranged to provide an alkali (potassium hydroxide) generating cathode compartment and an acid (sulphuric acid) generating anode compartment. The alkali (catholyte) is withdrawn and recycled into the generator combustor to renew the seed content of the working gas and remove $SO_2$ formed during the combustion of coal. The sulphuric acid (anolyte) is recovered by any convenient manner.

Optionally, the alkali may be concentrated or partially dried before recycling and may further be converted to potassium carbonate by contact with the substantially sulphur free carbon dioxide laden generator effluent gas. Alternately, the electrolytic cell may be operated to produce potassium carbonate directly in the alkali generating (cathode) compartment by introducing potassium bicarbonate as a feed into that compartment.

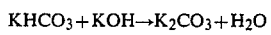

The potassium carbonate so generated may then be further contacted with the effluent $CO_2$ containing gas to produce potassium bicarbonate.

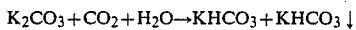

A portion of the carbonate precipitates and is used for recycling to the generator as seed and a portion which remains in solution is reused as the feed to the cathode department.

The electrolytic cells employed in the present invention is preferably a four compartment membrane cell as will hereinafter be described. Other type cells known in the art may however also be used such as those fully disclosed in U.S. Pat. No.'s 3,135,673; 3,222,267; 3,523,880; 3,661,762; 4,024,043; 4,082,835; 4,057,474 and others. The D.C. power produced by the MHD generator may be directly used to supply the power required for operation of the electrolytic cells.

The features and advantages of the invention will become more apparent from the description of the preferred embodiment and the drawings which follows.

DESCRIPTION OF THE PREFERRED EMBODIMENT

Figure 1:
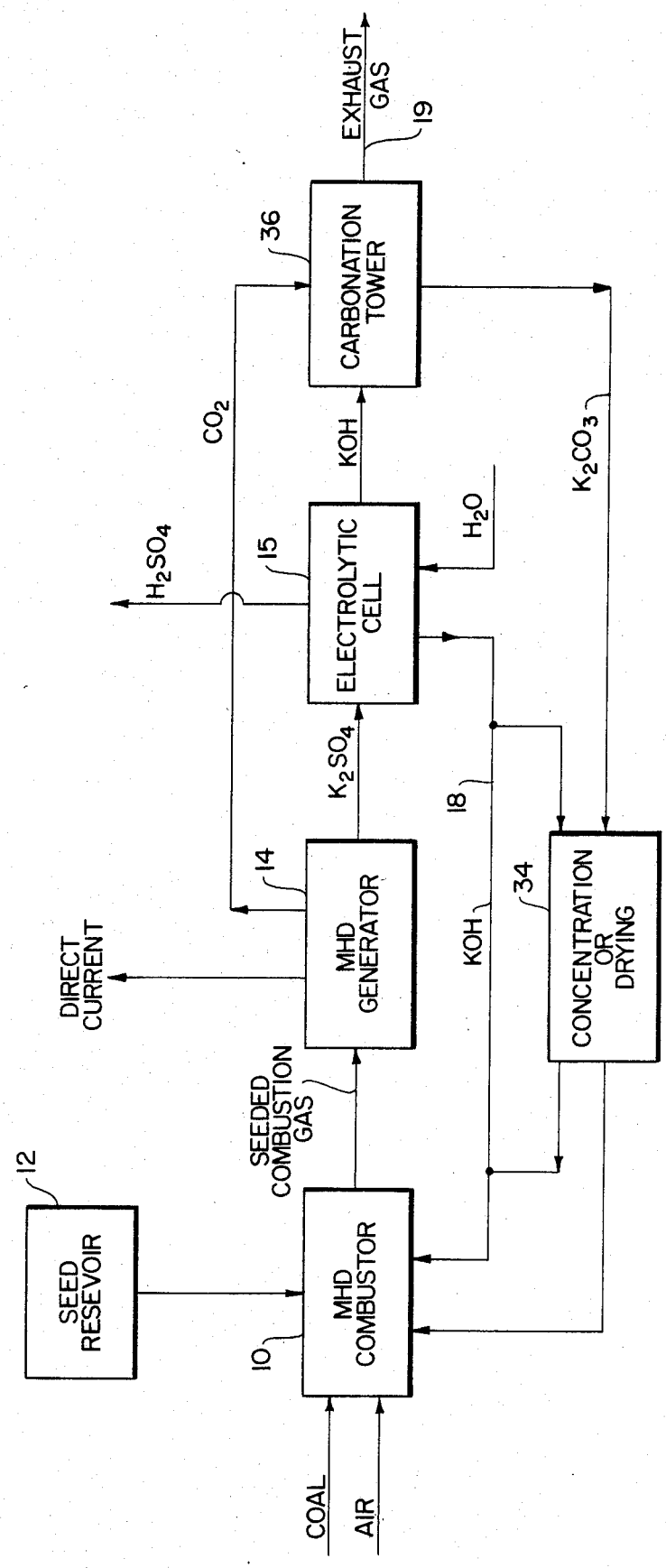
FIG. 1 is a schematic flow diagram of the preferred embodiment of the invention.

Referring to FIG. 1, there is shown a schematic flow diagram of a MHD electrical generator system incorporating the inventon. Coal is fed to combustor 10 where it is burned to produce a combustion gas containing sulphur which, when seeded with potassium from reservoir 12 or from the concentration or drying step 34, functions as the working fluid for the MHD direct current generator 14. The potassium may be in any convenient chemical combination such as potassium carbonate, bicarbonate, or hydroxide. The effluent gas of the generator contains potassium sulfate formed during combustion from the seed material and the sulphur contained in the coal. The potassium sulfate ($K_2SO_4$) is collected, dissolved (by apparatus not shown but well known in the art) and fed in solution to an electrolytic cell 15 of the type shown in detail in FIGS. 2 and 3.

The cell (FIGS. 2 and 3) is preferably a four compartment unit consisting of an alkali generating compartment 16 separated from a first feed compartment 18 by a cation selective membrane, a second feed compartment 22 separated from the first by an anion selective membrane, and an acid generating compartment 26 separated from the second feed compartment by an additional anion selective membrane. The cell structure is completed by electrodes 30 and 32, the cathode and anode respectively.

As indicated, potassium sulfate solution is fed to compartment 18 and water (or dilute $H_2SO_4$) to compartment 22. A voltage across the electrodes causes potassium ions to migrate from compartment 18 to compartment 16 where potassium hydroxide is formed and sulfate ions to compartments 22 and 26 where sulfuric acid is formed. The acid and hydroxide are withdrawn and the hydroxide if so desired may be recycled directly as seed material via loop 18 where it will react with the $CO_2$ in combustor to form the necessary carbonate compound for further reaction with the $SO_2$ to form $Na_2SO_4$. The acid is disposed of in a convenient manner and may be commercially utilized if desired. The depleted $K_2SO_4$ feed stream may be passed to the dissolver to be re-concentrated with incoming $K_2SO_4$.

The preferred operating temperature of the cell is in excess of about 30° C. At temperatures significantly below 30° C.; the efficiency of the cell decreases substantially.

Figure 2:
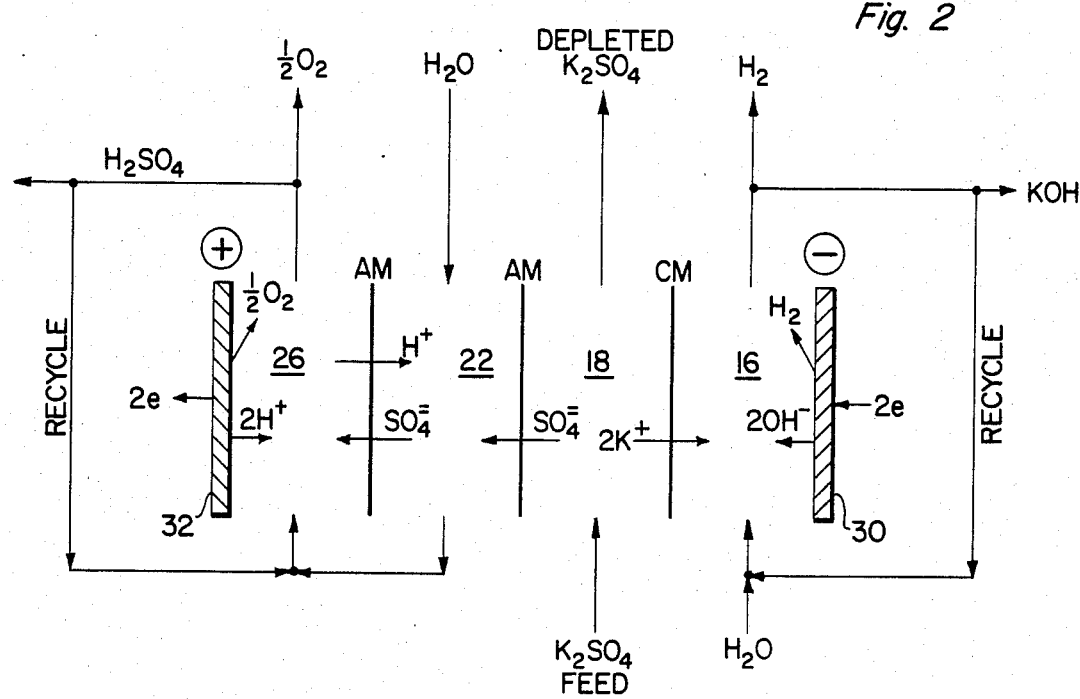
FIG. 2 is a schematic diagram of a four compartment electrolytic cell and method of operation appropriate for use in the embodiment of FIG. 1.

The cell of FIG. 2 may be slightly altered in design by replacing the anion membrane adjacent to the anode compartment 26 with a cation membrane and employing a water (or weak acid) feed to the anode containing compartment 26. The acidic effluent from compartment 26 is passed as feed solution into compartment 22 where it becomes more acidic due to the passage therein of $H^+$ and $SO_4^=$ from the adjacent compartments 26 and 18 respectively. The acidic solution is withdrawn as a product and if desired a small amount may be recycled into the anode compartment 26 along with the water feed to said compartment.

The hydroxide effluent solution from compartment 16 may optionally be concentrated prior to passage into the combustor as the thermodynamic balance of the system requires as indicated at 34. Because of the corrosive nature of the hydroxide it may be desirable to convert the same to potassium carbonate by passage to a carbonation tower 36 in contact with the generator effluent gas. This gas is rich in carbon dioxide and relatively sulfur free; the sulphur having combined with the potassium as described above. The resulting potassium carbonate may be precipitated and dried or partially concentrated prior to recycling as indicated at 34. The residual gas is vented at 19 to the atmosphere as exhaust.

Figure 3:
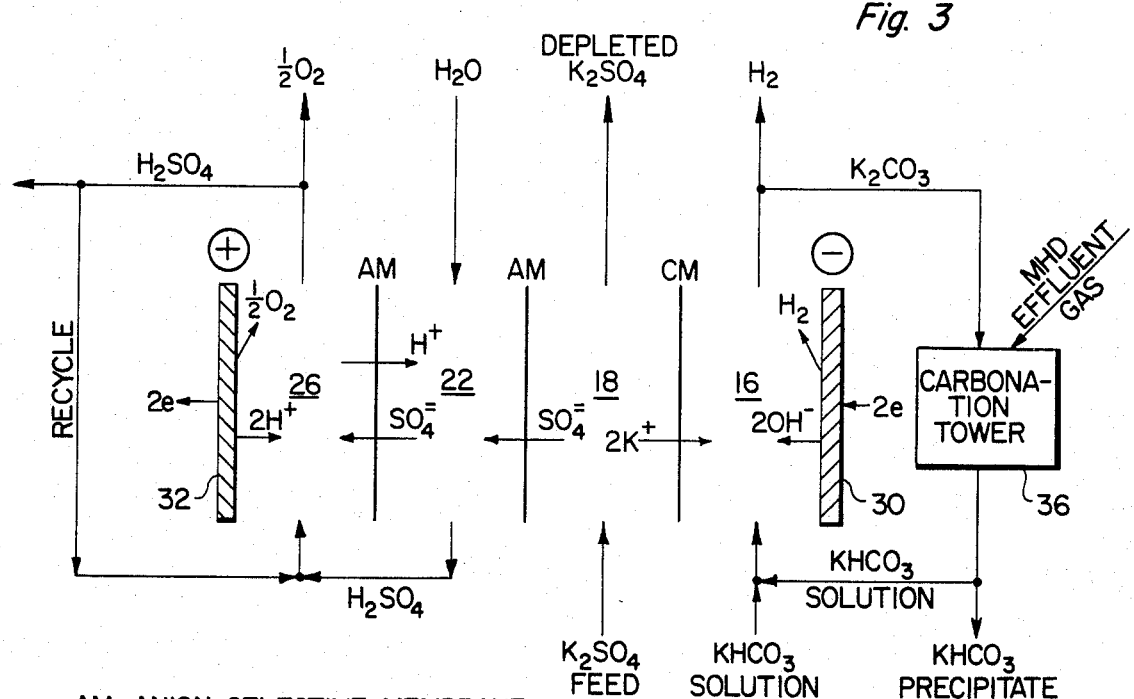
FIG. 3 is a schematic diagram of an additional method of operation of the cell of FIG. 2.

Referring to FIG. 3, an alternative method of operating the cell of FIG. 2 is shown in which like numerals indicate like components. The operation is the same as that described above except that a solution of potassium bicarbonate ($KHCO_3$) preferably saturated, is fed to compartment 16, where, potassium carbonate ($K_2CO_3$) is formed by reaction with the hydroxide generated therein. The carbonate is withdrawn and further carbonated by contact with the carbon dioxide laden MHD effluent. The reaction produces a saturated solution of potassium bicarbonate, a portion of which precipitates and a portion of which remains in solution for recycling to the cell. An advantage of this alternative method of operation is a reduced requirement for process water and energy due to the lower solubility of bicarbonate compared to carbonate. Substantially less water need be evaporated to produce solid potassium bicarbonate than that of potassium carbonate.

As previously stated, other electrolytic cell arrangements may be employed in the process. For example, the cells described in U.S. Pat. Nos. 3,135,673 and 3,523,880, can be used, although their efficiency is lower than the cell described in the preferred embodiment.

The foregoing disclosure is intended to be illustrative of representative and preferred forms of the present invention. In the claims appended hereto where elements of the method and apparatus are referred to generically, it is intended that such reference shall embrace the corresponding elements described in the disclosure and equivalents thereof. It is intended that the claims shall cover and embrace the invention both generically and specifically, the disclosure being illustrative and the invention to be accorded the full scope of the claims.

The embodiments of this invention in which an exclusive property or privilege is claimed are defined as follows:

1. In a magnetohydrodynamic (MHD) coal fired alkali metal seeded electrical generating system, the process for desulphurization and seed regeneration comprising:
   a. collecting alkali metal sulfate from the effluent gas of the combustion zone of said generator;
   b. preparing an aqueous solution of said alkali metal sulfate and feeding the same to an electrolytic cell for converting alkali metal sulfate to sulphuric acid and alkali metal hydroxide solutions;
   c. withdrawing said sulphuric acid and said hydroxide solutions from said cell;
   d. contacting said hydroxide solution with said generator effluent gas, said gas containing a substantial amount of carbon dioxide, to produce an alkali metal carbonate solution; and
   e. recycling said carbonate solution into the combustion zone of said generator.

2. The process of claim 1 further including the step of precipitating and drying said alkali metal carbonate prior to said recycling into said combustion zone.

3. The process of claim 1 further including the step of introducing alkali metal bicarbonate into the cathode compartment of said electrolytic cell, withdrawing a solution of alkali metal carbonate from said cathode compartment, contacting said carbonate solution with said generator effluent gas, said effluent gas containing a substantial amount of carbon dioxide to further produce alkali metal bicarbonate, precipitating at least a portion of said bicarbonate, and recycling said bicarbonate precipitate into the combustion zone of said generator.

* * * * *